US006731615B1

(12) United States Patent
Bousquet et al.

(10) Patent No.: US 6,731,615 B1
(45) Date of Patent: May 4, 2004

(54) MULTIPOINT-TO-POINT TDMA TRANSMISSION SYSTEM USING A PARTICULAR BURST STRUCTURE, AND A CORRESPONDING TRANSMITTER

(75) Inventors: Jacques Bousquet, Croissy sur Seine (FR); Francois Durnez, Paris (FR); Christophe Gerrier, Bois-Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/551,493

(22) Filed: Apr. 18, 2000

(30) Foreign Application Priority Data

Apr. 19, 1999 (EP) ........................... 99 440 078

(51) Int. Cl.⁷ ........................... H04B 7/212; H04J 3/212
(52) U.S. Cl. ........................ 370/321; 370/324; 370/528; 455/103
(58) Field of Search ................................ 370/316, 321, 370/324, 347, 350, 319, 343, 503, 504, 528, 527, 529, 514; 455/427, 500, 12.1, 67.3, 59, 103, 311, 11.1; 375/231

(56) References Cited

U.S. PATENT DOCUMENTS 5,566,172 A    10/1996  Mouret 5,583,870 A *  12/1996  Delprat et al. ............... 370/337
6,256,486 B1 *  7/2001  Barany et al. ............... 455/296
6,337,855 B1 *  1/2002  Malkamaki .................. 370/347

FOREIGN PATENT DOCUMENTS

EP        0 903 872 A1    3/1999
FR        2 700 086 A1    7/1994
WO        WO 96/27959     9/1996

* cited by examiner

*Primary Examiner*—Duc Ho
(74) *Attorney, Agent, or Firm*—Sughrue Mion, PLLC

(57) ABSTRACT

The invention relates in particular to a TDMA transmission system including transmitters synchronized to a single receiver, each of the transmitters being able to transmit to the receiver on a given carrier frequency bursts with lengths which are all multiples of that of a unit burst including a guard time, the unit bursts including at least one guard time and the receiver being adapted to receive simultaneously bursts from different transmitters. According to the invention, each transmitter includes means for inserting a filler sequence into each burst to be transmitted at each location of the burst that is likely to correspond to a guard time in a burst received simultaneously on a different carrier frequency. The invention reduces the harmful effects of interference if the time of reception of the guard time of a burst on a first carrier frequency corresponds to the time of reception of information symbols in another burst received simultaneously on another carrier frequency.

12 Claims, 2 Drawing Sheets

MULTIPOINT-TO-POINT TDMA TRANSMISSION SYSTEM USING A PARTICULAR BURST STRUCTURE, AND A CORRESPONDING TRANSMITTER

The field of the invention is that of radio communications. To be more precise, the present invention relates to a multipoint-to-point TDMA transmission system using a particular burst structure enabling the same transmission system to transmit different types of information, for example voice and data.

BACKGROUND OF THE INVENTION

In a time-division multiple access (TDMA) system, each user employs a given frequency during a given time slot, the other time slots being reserved for other users. The signal transmitted by a user in the allocated time slot is referred to as a burst.

In the remainder of this description each transmitted burst is considered to include:

- a guard time containing no signal at the start and/or the end of the burst, and
- information symbols obtained by modulating the transmitted signal.

In the remainder of this description:

- the expression "unit burst" refers to the signal transmitted in the shortest time slot allocated to a user, referred to as a "unit time slot", and
- the term "superburst" refers to a burst whose length is a multiple of that of the unit burst allocated to a single user, corresponding to a plurality of consecutive unit bursts, referred to as "adjacent bursts".

In the case of voice transmission, characterized by exactly the same regular bit rate for each user, each user is regularly allocated a unit time slot. The duration of the time slot is a constant of the transmission system and is matched to the characteristics of the voice transmission service in terms of bit rate, delay, or required error rate. Adaptation is required if the same transmission system must simultaneously support different types of services each having its own characteristics. Different types of information, such as voice and data, are conventionally transmitted by allocating users respective numbers of unit time slots according to their requirements.

This approach can be extended to increase bit rate, as described in U.S. Pat. No. 5,566,172, which discloses a method in which a plurality of consecutive unit time slots are grouped together and allocated to a single user who can transmit a superburst in that time slot. The grouping substitutes information symbols for redundant sequences, such as the guard times between two superburst information symbol sequences. This reduces redundancy within the superburst and optimizes the quantity of information transmitted in the superburst.

If the communications system includes an entity for amplifying the received signal before retransmitting it, for example a satellite, the inherent characteristics of the amplifier of that entity generate interference at sudden transitions in signal amplitude. Such transitions are observed each time that a guard time, in which there is no signal and which therefore has a negligible signal amplitude, intersects a flow of information having a non-negligible signal amplitude. The interference is caused by the fact that the amplifier introduces a modification to the phase of the output signal which is a function of the amplitude of the input signal. If the amplitude of the amplifier input signal varies suddenly, the phase of the amplified signal at the amplifier output varies by a large amount.

FIG. 1 shows an example illustrating the above problem.

Four transmitters 1, 2, 3 and 4 connected to respective transmit antennas 11, 21, 31 and 41 communicate with a base transceiver station 6 via communications channels and a satellite 5. The transmitters 1, 2 and 3 are of the same type and transmit voice type information. These three transmitters transmit in turn on the same carrier frequency F1 during unit time slots. In each triplet of consecutive time slots, the transmitter 1 is allocated the first time slot, the transmitter 2 is allocated the second time slot and the transmitter 3 is allocated the third time slot. The transmitter 4 transmits data type information on a carrier frequency F2 different from the carrier frequency F1. The transmitter 4 is the only one to transmit on the frequency F2 and transmits a series of consecutive superbursts occupying a time slot three times longer than a unit time slot. It therefore offers a transmission bit rate three times that of the voice type information transmitters 1, 2 and 3.

The amplifier connected directly to the receive antenna of the satellite 5 simultaneously amplifies the signal contained in the bursts which are transmitted by different transmitters on different carriers and which reach the amplifier synchronously. If all the bursts are the same length, the guard times coincide exactly and the interference has no harmful effects. However, when bursts and superbursts coexist, as in the example to which FIG. 1 relates, there are times at which the guard time of a burst received on a given frequency corresponds to one or more information symbols in a superburst received on another frequency.

FIG. 2 shows the time and frequency spreading of the information received at the satellite 5 in the case of the transmission system shown in FIG. 1. To be more precise, FIG. 2 represents a succession of bursts received in parallel at the frequencies F1 and F2 and plotted on two axes having the same time origin. The bursts B1, B2 and B3 received on the carrier frequency F1 are juxtaposed unit bursts from the transmitters 1, 2 and 3, respectively. The bursts B4 received on the carrier frequency F2 are superbursts three times the length of the unit burst from the transmitter 4.

There is a guard time at the start and at the end of each transmitted unit burst or superburst. The guard times 12, 22, 32 and 42 are start of burst guard times transmitted by the transmitters 1, 2, 3 and 4, respectively. The guard times 13, 23, 33 and 43 are end of burst guard times transmitted by the transmitters 1, 2, 3 and 4, respectively.

Each burst includes a training sequence directly after the start guard time and directly before the end guard time. These training sequences are shown in FIG. 2 but are not identified by any reference symbols.

Each of the bursts B1, B2, B3 and B4 also includes respective information symbols 14, 24, 34 and 44 corresponding to the payload information transmitted by the user to whom the burst is allocated.

The start of burst guard time 12 transmitted by the transmitter 1 is received at the same time as the start of burst guard time 42 transmitted by the transmitter 4.

The end of burst guard time 13 transmitted by the transmitter 1 and the start of burst guard time 22 transmitted by the transmitter 2 are adjacent and received at the same time as the information symbols 441 of the burst transmitted by the transmitter 4.

The end of burst guard time 23 transmitted by the transmitter 2 and the start of burst guard time 32 transmitted by the transmitter 3 are adjacent and received at the same time as the information symbols 442 of the burst transmitted by the transmitter 4.

The end of burst guard time 33 transmitted by the transmitter 3 is received at the same time as the end of burst guard time 43 transmitted by the transmitter 4.

Interference generated when the amplifier of the satellite 5 receives the guard times modifies the phase of the signal conveyed in the superburst at the corresponding locations 42, 441, 442 and 43. The locations 42 and 43 are guard times and interference here therefore has no harmful effect. The locations 441 and 442 containing information symbols are sensitive to the interference, however, which gives rise to a signal demodulation problem. Because the phase of the information symbols contained in each burst is estimated, and used to demodulate the signal, any such phase modification causes many demodulation errors in the information symbols at the locations 441 and 442.

OBJECTS AND SUMMARY OF THE INVENTION

Because the superbursts are used for data services, which generally have stricter error rate requirements than voice services, an object of the present invention is to define a superburst structure which protects the superburst information symbols from the harmful effects of amplifier non-linearities and which optimizes the quantity of information transported in the superburst.

The above objects, and others that become apparent hereinafter, are achieved by inserting filler sequences at the locations of superbursts not occupied by a guard time and likely to correspond to a location occupied by a guard time in a burst received simultaneously on a different carrier frequency.

Thus non-linearities induced by a guard time on a particular carrier frequency do not interfere with information symbols because the information symbols never coincide with guard times received at the same time on another carrier frequency. This limits the error rate caused by interference due to non-linearities of the amplifier.

In a preferred embodiment, each filler sequence inserted into a superburst is made longer than the guard time it has to cover. Its length is preferably equal to the length of the guard time to be covered plus twice the absolute synchronization uncertainty, the sequence being centered in the middle of the corresponding guard time.

The filler sequence can advantageously be a training sequence, which provides the receiver with regular training sequences in addition to solving the above problem. Introducing additional training sequences into a superburst has the advantage of improving tracking of drift in the frequency of the signal received at the receiver, which assures good demodulation quality.

BRIEF DESCRIPTION OF THE DRAWINGS

Other features and advantages of the invention become apparent in the course of the following description of a preferred embodiment of the invention, which is given by way of illustrative and non-limiting example, and from the accompanying drawings, in which.

MORE DETAILED DESCRIPTION

Figure 1:
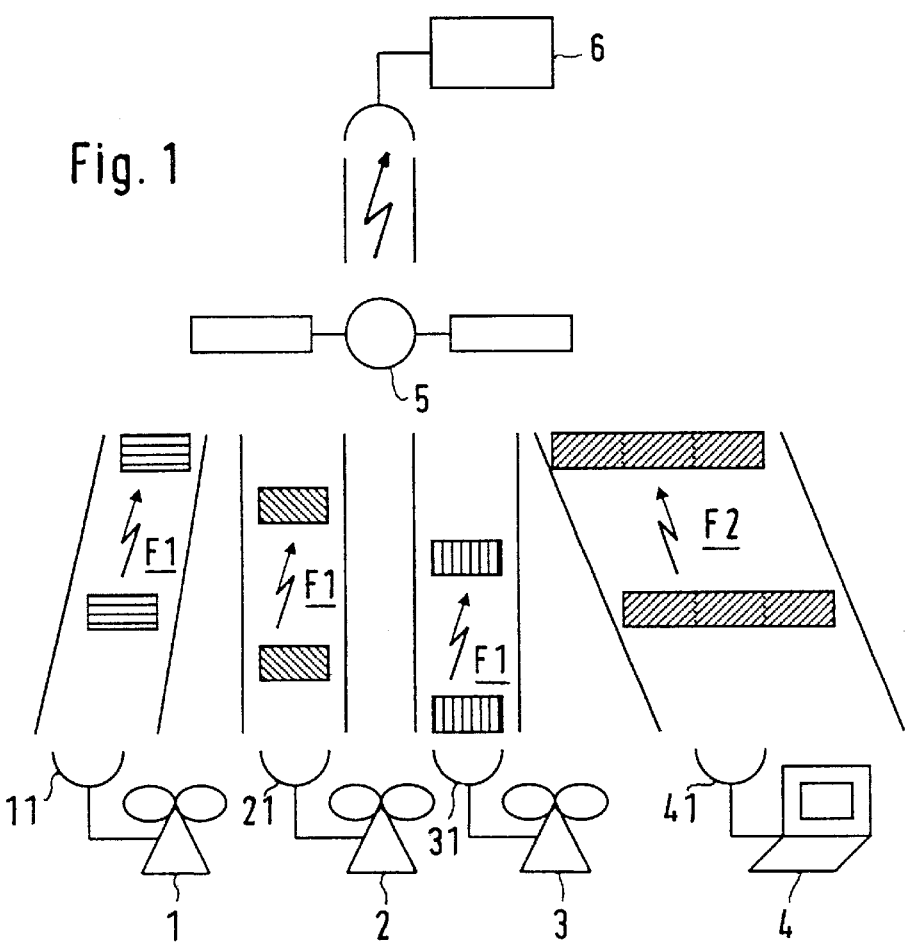
FIG. 1 shows a communications system made up of transmitters of different types and a satellite for relaying received information to a base transceiver station.
Figure 2:
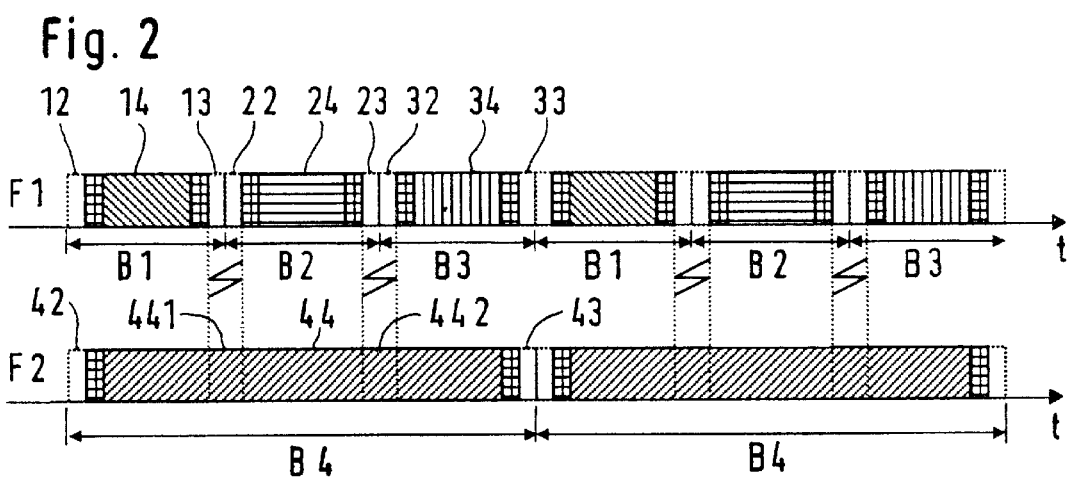
FIG. 2 represents the time structure of the information received by the satellite on the various carrier frequencies used by the transmitters.
Figure 3:
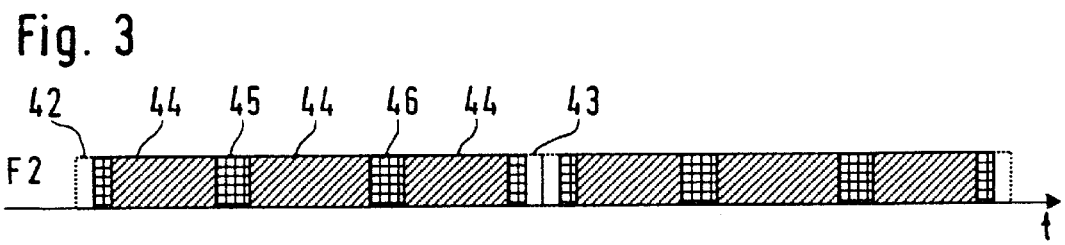
FIG. 3 represents the structure of a superburst in accordance with the invention.

An embodiment of the invention is described with reference to FIG. 1, which represents a communications system including four transmitters which transmit information bursts to a satellite using a TDMA type technique for accessing the medium as described above. FIG. 3 shows the superburst structure of the invention. FIGS. 2 and 3 are correlated, in that the axes represented have the same time origin. At the locations 441 and 442 of the superburst defined above with reference to FIG. 2, respective training sequences 45 and 46 are introduced covering exactly the location corresponding to the carrier frequency F1 at the guard times 13, 22, 23 and 32. Those guard times have the particular feature of corresponding to different locations of the end of the superburst.

The locations at which training sequences must be inserted to achieve the object of the invention can be extrapolated from FIG. 3 for any superburst whose length is any multiple of the unit burst length.

The training sequences can take any form and need not necessarily take the form of start and end of burst training sequences. The training sequences in a unit burst must enable the receiver to determine transmission phase to assure good demodulation quality by allowing for any frequency drift caused by instabilities of the physical transmit and receive units and due in particular to the use of very high carrier frequencies. In the case of a superburst, it is advantageous to use training sequences at intervals as regular as those between the training sequences at the start and at the end of a unit burst. This enables equally accurate tracking of the signal frequency regardless of the length of the burst. The accuracy would not be so high, and would lead to demodulation errors, if the frequency drift were evaluated without regard to the start and end of burst training sequences. Increasing the number of training sequences avoids some demodulation errors and thus contributes to a low error rate in the superbursts, the necessity for which has already been explained.

In a preferred embodiment, the invention can be extended to cover synchronization uncertainties. Although the transmitters are synchronized, there may be some uncertainty as to the precise time of arrival at the receiver of information transmitted by a transmitter. This uncertainty can lead to the overlapping of two bursts which are transmitted by different transmitters on the same carrier and which should reach the receiver in adjacent time slots, for example if the first burst arrives later than expected and the next one sooner than expected. This is avoided by choosing guard times which guarantee that bursts will not overlap and which make allowance for the uncertainty of synchronization. The absolute synchronization uncertainty is defined by the duration of the period in which the start of the signal contained in a burst subject to synchronization uncertainty is likely to be received by the receiver. The absolute synchronization uncertainty also extends both sides of the time at which the start of the burst should be received in the ideal case of no synchronization uncertainty.

Figure 4:
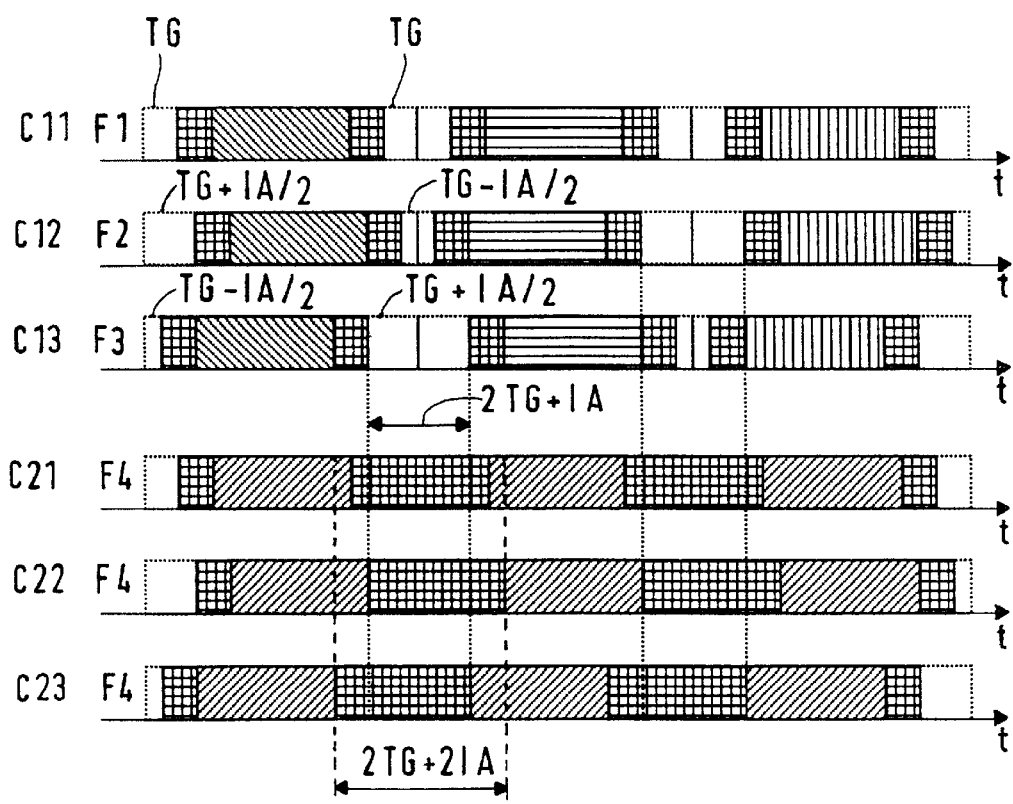
FIG. 4 shows a preferred structure of a superburst in accordance with the invention allowing for absolute synchronization uncertainty.

FIG. 4 shows three cases of reception of three consecutive unit bursts by the antenna of the satellite 5.

The first case C11 represents the reception of three consecutive bursts when synchronization uncertainty is not taken into account.

The second case C12 represents the extreme case in which the first burst is late by half the absolute synchronization uncertainty, the second burst is early by half the absolute synchronization uncertainty and the third burst is late by half the absolute synchronization uncertainty.

The third case C13 represents the opposite extreme case in which the first burst is early by half the absolute synchronization uncertainty, the second burst is late by half the absolute synchronization uncertainty and the third burst is early by half the absolute synchronization uncertainty.

In the worst case scenario, assuming that the bursts of each of the described cases are received simultaneously by the receive antenna of the satellite on different frequencies F1, F2, F3, the maximum duration corresponding to the presence of the guard time on the various frequencies is equal to twice the nominal duration of a guard time plus the absolute synchronization uncertainty.

The next three diagrams in FIG. 4 represent three cases of reception of a superburst by the antenna of the satellite 5.

The first case C21 represents reception of a superburst when the synchronization uncertainty is not taken into account.

The second case C22 represents the extreme case in which the superburst is late by half the absolute synchronization uncertainty.

The third case C23 represents the opposite extreme case in which the superburst is early by half the absolute synchronization uncertainty.

Assuming that the receive antenna of the satellite receives the superburst on a frequency F4 at the same time as the bursts previously described in the three cases C11, C12 and C13, and in order for the locations of the superburst likely to correspond to a guard time in any of the various cases C21, C22 and C23, a training sequence must be provided with twice the nominal length of a guard time plus twice the absolute synchronization uncertainty.

Note that, in defining the length and position of the training sequences to be inserted, the present invention accommodates all combinations between the combination that does not take synchronization uncertainties into account and the combination that represents the worst case scenario in terms of synchronization uncertainties.

In an embodiment offering lower performance in terms of transmission quality, but enabling more payload information to be transmitted in the frame, consideration may be given to inserting filler sequences shorter than the corresponding guard time in a parallel burst.

The invention can also be applied with advantage if the transmitters are base transceiver stations each transmitting adjacent streams of bursts, referred to as frames, in parallel on different frequencies. These bursts being of the same type as those previously described, there arises the same problem of superposition of guard times and information symbols at a common receiver, for example a satellite, and this problem can be solved by the invention in the manner described.

The invention can also be applied to a wireless local loop.

What is claimed is:

1. A TDMA transmission system comprising a plurality of transmitters synchronized to each other and to a single receiver, each of said transmitters being able to transmit to said receiver bursts with lengths which are all multiples of a unit burst including a guard time, said receiver simultaneously receiving parallel bursts from transmitters using different carrier frequencies, wherein at least one of said transmitters comprises means for inserting a filler sequence into each burst to be transmitted at each location of said burst that is not occupied by a guard time and is likely to correspond to a location occupied by a guard time in one of said parallel bursts.

2. A transmission system according to claim 1, wherein each of said filler sequences has a length not less than the length of the guard time likely to correspond to it in one of said parallel bursts.

3. A transmission system according to claim 2, wherein each of said filler sequences has a length equal to the length of the guard time likely to correspond to it in a parallel burst plus twice the absolute synchronization uncertainty, said sequence being centered in the middle of said location.

4. A transmission system according to claim 1, wherein said filler sequence is a training sequence.

5. A transmission system according to claim 1, wherein said receiver is a component of the payload of a satellite providing a relay between said transmitters and a base transceiver station.

6. A transmission system according to claim 1, wherein said transmitters and said receiver form a wireless local loop.

7. A transmitter for a TDMA transmission system, said transmitter being adapted to be synchronized to a receiver and other transmitters, said transmitter being able to transmit to said receiver bursts with lengths which are all multiples of a unit burst including a guard time, said receiver being adapted to receive simultaneously a burst from said transmitter and parallel bursts from said other transmitters using different carrier frequencies, wherein said transmitter comprises means for inserting a filler sequence into each burst to be transmitted at each location of said burst that is not occupied by a guard time and is likely to correspond to a location occupied by a guard time in one of said parallel bursts.

8. A transmitter according to claim 7, wherein each of said inserted filler sequences has a length not less than the length of the guard time likely to correspond to it in one of said parallel bursts.

9. A transmitter according to claim 8, wherein each of said inserted filler sequences has a length equal to the length of the guard time likely to correspond to it in a parallel burst plus twice the absolute synchronization uncertainty, said sequence being centered in the middle of said location.

10. A transmitter according to claim 7, wherein said filler sequence is a training sequence.

11. A TDMA transmission system comprising a plurality of transmitters synchronized to each other and to a single receiver, each of said transmitters being able to transmit to said receiver bursts with lengths which are all multiples of a unit burst including a guard time, said receiver simultaneously receiving parallel bursts from transmitters using different carrier frequencies, wherein each of said transmitters inserts a filler sequence into at least one burst to be transmitted at each location of said burst that is not occupied by a guard time and is likely to correspond to a location occupied by a guard time in one of said parallel bursts.

12. A transmitter for a TDMA transmission system, said transmitter being adapted to be synchronized to a receiver and other transmitters, said transmitter being able to transmit to said receiver bursts with lengths which are all multiples of a unit burst including a guard time, said receiver being adapted to receive simultaneously a burst from said transmitter and parallel bursts from said other transmitters using different carrier frequencies, wherein said transmitter inserts a filler sequence into each burst to be transmitted at each location of said burst that is not occupied by a guard time and is likely to correspond to a location occupied by a guard time in one of said parallel bursts.

* * * * *